No. 873,408. PATENTED DEC. 10, 1907.
C. E. BRINLEY & R. H. BOWEN.
WHEEL.
APPLICATION FILED JAN. 9, 1906.
2 SHEETS—SHEET 1.
FIG. I.
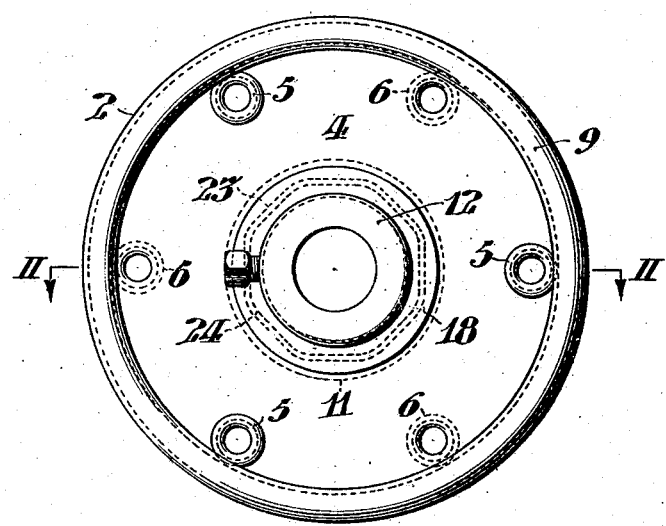
FIG. II.
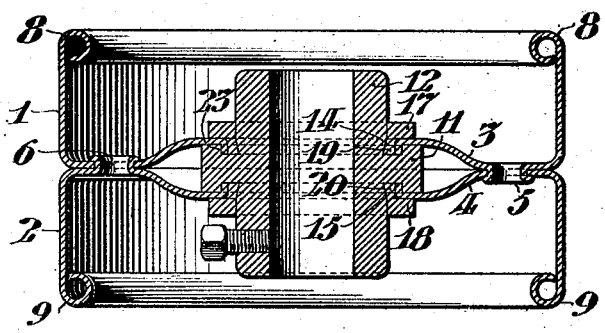
FIG. III.
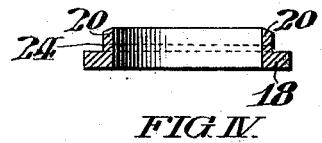
FIG. IV.
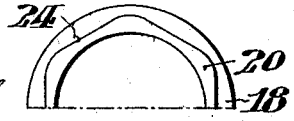
WITNESSES:
Clifton C. Hallowell
John E. Bergner
INVENTORS:
CHARLES E. BRINLEY
AND
RUSSELL H. BOWEN,
by Paige, Paul & Foley
Attys.

No. 873,408. PATENTED DEC. 10, 1907.
C. E. BRINLEY & R. H. BOWEN.
WHEEL.
APPLICATION FILED JAN. 9, 1906.
2 SHEETS—SHEET 2.
FIG. V.
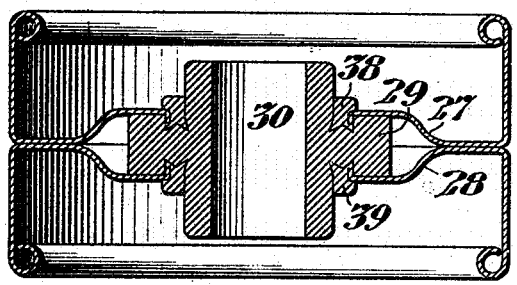
FIG. VI.
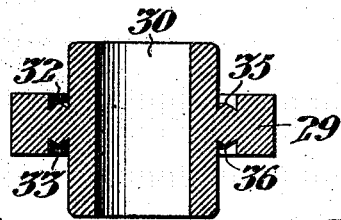
FIG. VIII.   FIG. VII.   FIG. X.
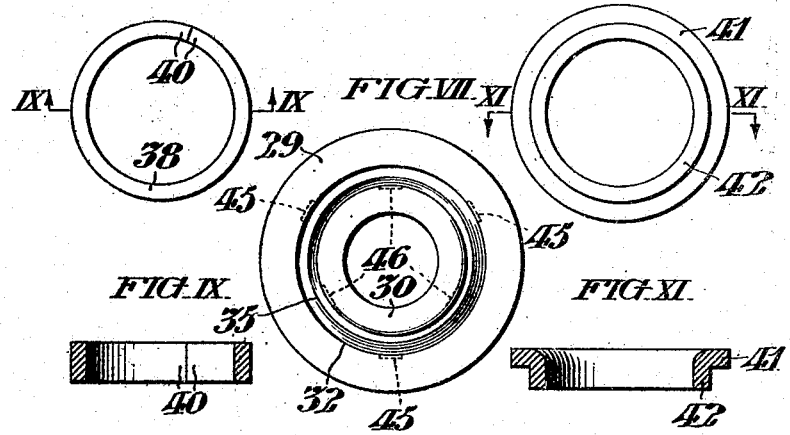
FIG. IX.   FIG. XI.
WITNESSES:
Clifton C. Hallowell
John E. Bergner
INVENTORS:
CHARLES E. BRINLEY
AND
RUSSELL H. BOWEN
By Paige, Paul & Foley
Attys.

UNITED STATES PATENT OFFICE.

CHARLES E. BRINLEY, OF PHILADELPHIA, PENNSYLVANIA, AND RUSSELL H. BOWEN, OF PALMYRA, NEW JERSEY, ASSIGNORS TO THE AMERICAN PULLEY COMPANY, OF PHILADELPHIA, PENNSYLVANIA, A CORPORATION OF PENNSYLVANIA.

WHEEL.

No. 873,408.      Specification of Letters Patent.      Patented Dec. 10, 1907.

Application filed January 9, 1906. Serial No. 295,231.

*To all whom it may concern:*

Be it known that we, CHARLES E. BRINLEY, of Philadelphia, in the county of Philadelphia and State of Pennsylvania, and RUSSELL H. BOWEN, of Palmyra, in the county of Burlington and State of New Jersey, have invented certain new and useful Improvements in Wheels, whereof the following is a specification, reference being had to the accompanying drawings.

Our improvements may be advantageously employed in pulleys constructed of pressed sheet metal, as our invention provides a hub which may be permanently secured in such a wheel without separate attaching means.

As hereinafter described, our invention comprises a hub having a tubular core with an exterior flange intermediate of its length and circumferential recesses upon opposite sides of said flange; retaining collars arranged to slip over said core, embrace respective spoke webs of a pulley and be deformed, by pressure, into engagement with the recesses of said core, so as to permanently secure the core and spoke webs in assembled relation without separate attaching means. As described, the contiguous perimeters of said core, collars and spoke webs may be of polygonal configuration so as to positively prevent relative rotation of said members when secured as described.

Our invention comprises the various novel features of construction and arrangement hereinafter more definitely specified.

In the drawings, Figure I, is a side elevation of a pulley conveniently embodying our improvements. Fig. II, is a sectional view, taken on the line II, II, in Fig. I. Fig. III, is a sectional view of the lower one of the two retaining collars shown in Fig. II, but in its initial form. Fig. IV, is a half plan view of the retaining collar shown in Fig. III. Fig. V, is a sectional view similar to Fig. II, but showing a modified form of the invention. Fig. VI, is a sectional view of the tubular core shown in Fig. V, but in its initial form. Fig. VII, is a plan view of a tubular core similar to Fig. VI, but provided with a series of under cut recesses. Fig. VIII is a plan view of one of the retaining collars shown in Fig. V, but in its initial form. Fig. IX, is a sectional view of the collar shown in Fig. VIII, taken on the line IX, IX, in said figure. Fig. X, is a plan view of a modified form of retaining collar. Fig. XI, is a sectional view of the retaining collar shown in Fig. X, taken on the line XI, XI, in said figure.

Referring to Figs. I to IV inclusive; the pulley rim comprises two axially alined cylindrical sections 1, and 2, respectively in unitary relation with annular spoke webs 3, and 4, which are divergently dished at their central portions as shown in Fig. II, and secured together by tubular riveted projections 5, and 6, which latter are in unitary relation with the respective webs 3, and 4, as shown in Fig. II, and disposed in alternation in a circular series as indicated in Fig. I. Said rim sections 1 and 2, are conveniently reinforced at their opposite edges by the tubular flanges 8, and 9, which may be hollow as indicated in Fig. II, or be filled with reinforcing bars.

As shown in Fig. II, said webs 3, and 4, are disposed upon respectively opposite sides of the annular flange 11, which extends in unitary relation with the tubular core 12, intermediate of the length of the latter. Said core comprises undercut circumferential recesses 14, and 15, upon the respectively opposite sides of said flange 11, and said spoke webs 3, and 4, are respectively embraced between said flange 11, and the retaining collars 17, and 18, whose inwardly projecting flanges 19, and 20, are finally deformed to fill the recesses 14, and 15, as shown in Fig. II.

It is to be understood that said retaining collars 17, and 18, are initially shaped as indicated in Figs. III and IV, and so proportioned as to slide over the opposite ends of the core 12, until their inwardly projecting flanges 19, and 20, encounter the flange 11, on said core, and, thereupon, pressure axially directed on said collars toward said flange 11, results in the deformation of said flanges 19, and 20, to fill the recesses 14, and 15, as shown in Fig. II, in permanent engagement with the core 12, and spoke webs 3 and 4.

It may be noted that in the form of our invention above described, the outer walls 23, of the recesses 14, and 15, and the perimeters 24, of the retaining collars 17, and 18, are of corresponding polygonal configuration, so that when the parts are assembled as shown in Fig. II, the inner edges of the spoke webs 3, and 4, assume a corresponding polygonal configuration, and relative rotation of the tubular core and spoke webs is prevented. However, it is to be understood that retaining collars of circular configuration may be employed and said members be prevented from relative rotation merely by their frictional engagement. For instance, as shown in Fig. V, the spoke flanges 27, and 28, are disposed upon respectively opposite sides of the annular flange 29, which extends in unitary relation with the tubular core 30, intermediate of the length of the latter. As indicated in Fig. VI, said core 30, comprises circumferential recesses 32, and 33, which, in their initial form, shown in Fig. VI, are not undercut, but have cylindrical walls parallel with the axis of said core. The axially opposite faces of said recesses 32, and 33, are provided with circular ridges 35, and 36, which serve to bifurcate the approximate edges of the retaining collars 38, and 39, so that the inner bifurcated edges of said collars are embedded in the core 30, as indicated in Fig. V, with the undercut effect shown exaggerated in said figure. The collars 38, and 39, shown in Fig. V, may be primarily of the plane ended circular form shown in Figs. VIII and IX, and as therein indicated, may each be a strip of sheet metal bent in annular form with its ends 40, in contact.

Although retaining collars of the form shown in Figs. VIII, and IX, and above described, may be conveniently constructed of strips of any malleable sheet metal, for instance steel; it is to be understood that cast metal retaining collars similar to those shown in Figs. I, to IV, inclusive, may be employed in the form of our invention shown in Fig. V. One of such retaining collars is shown in Figs. X, and XI; comprising a flange 41, extending transversely with respect to its axis and a flange 42, extending parallel with its axis, the latter flange having initially parallel sides as indicated in Fig. XI, which are diverged when its inner edge is bifurcated like the collars shown in Fig. V.

Although in the form of our invention shown in Figs. V to XI, inclusive, relative rotation of the spoke webs 27, and 28, and the tubular core 30, may be prevented by mere frictional engagement incident to the deformation of the retaining collars in the recesses of said core; means for positively preventing such movement may be provided as indicated in Fig. VII, comprising pockets 45 and 46, respectively in the flange 29, and core 30, on opposite sides of each recess 32, and 33, so that when the retaining collars are deformed in said recesses the metal is caused to flow into said pockets and interlock therewith. Moreover, it is to be understood that a web connecting the rim of a wheel with its hub may be held as above described by frictional engagement of collar members, similar to those above described, in recesses in the hub without apparent deformation of said members. Therefore, we do not desire to limit ourselves to the precise details of construction and arrangement herein set forth, as it is obvious that various modifications may be made therein without departing from the essential features of our invention.

We claim:—

1. In a wheel, a hub comprising an annular recess; an annular ridge in said recess and an annular member divided in contact with said ridge and so shaped in said recess as to be inseparably interlocked therewith, substantially as set forth.

2. In a wheel, the combination with a rim having a spoke member arranged to connect said rim with a hub; of a unitary hub comprising a cylindrical axial bearing extending from end to end thereof and having a recess distinct from said axial bearing; and, a member distinct from said spoke member and hub so shaped in said recess as to be inseparably interlocked therewith; the thickness of said member within said recess being greater than the width of opening from said recess, substantially as set forth.

3. In a wheel, the combination with a rim having a spoke member arranged to connect said rim with a hub; of a unitary hub comprising a cylindrical axial bearing extending from end to end thereof and having a recess distinct from said axial bearing; and, a collar distinct from said hub and spoke member, so shaped in said recess as to be inseparably interlocked therewith; the thickness of said collar within said recess being greater than the width of opening from said recess, substantially as set forth.

4. In a wheel, the combination with a rim having a spoke member arranged to connect said rim with a hub; of a unitary hub comprising a cylindrical axial bearing extending from end to end thereof and having a recess distinct from said axial bearing; and, a collar, formed of an annularly bent strip, distinct from said hub and spoke member, so shaped in said recess as to be inseparably interlocked therewith; the thickness of said collar within said recess being greater than the width of opening from said recess, substantially as set forth.

5. In a wheel, the combination with a rim having a spoke member arranged to connect said rim with a hub; of a unitary hub comprising a cylindrical axial bearing extending from end to end thereof and having a recess distinct from said axial bearing; and, a member distinct from said hub and spoke member so shaped in said recess as to be inseparably interlocked therewith; the contiguous surfaces of the interlocked members being of circumferentially irregular configuration; and the thickness of said member within said recess being greater than the width of opening from said recess, substantially as set forth.

6. In a wheel, a hub comprising an axial bearing and an annular flange extending in unitary relation with said hub intermediate of the length of the latter and having undercut recesses exterior to said bearing and upon the respectively opposite sides of said flange; and members so shaped in said recesses as to be inseparably interlocked therewith; the thickness of said members within said recesses being greater than the width of openings from said recesses, substantially as set forth.

7. In a wheel, a hub comprising an axial bearing and an annular flange extending in unitary relation with said hub intermediate of the length of the latter and having undercut annular recesses upon the respectively opposite sides of said flange, exterior to said bearing; spoke members distinct from said hub, and having flanges respectively fitted in said recesses; and collars so shaped in said recesses as to be inseparably interlocked therewith; the thickness of said collars within said recesses being greater than the width of the openings from said recesses, substantially as set forth.

In testimony whereof, we have hereunto signed our names at Philadelphia, in the county of Philadelphia and State of Pennsylvania, this fifth day of January, 1906.

CHARLES E. BRINLEY
RUSSELL H. BOWEN.

Witnesses:
ALBERT W. MORRIS,
JOSEPH ENTWISLE.